United States Patent
Choi (10) Patent No.: US 6,404,422 B1
(45) Date of Patent: Jun. 11, 2002

(54) APPARATUS AND METHOD FOR AUTOMATICALLY CONTROLLING SCREEN STATUS OF LIQUID CRYSTAL DISPLAY

(75) Inventor: Kyoung-Oh Choi, Seoul (KR)

(73) Assignee: Samsung Electronics Co. Ltd., Suwon (KR)

( * ) Notice: Subject to any disclaimer, the term of this patent is extended or adjusted under 35 U.S.C. 154(b) by 189 days.

(21) Appl. No.: 09/597,092

(22) Filed: Jun. 20, 2000

(30) Foreign Application Priority Data

Jul. 20, 1999 (KR) .......................................... 99/29386

(51) Int. Cl.[7] .................................................. G09G 5/00
(52) U.S. Cl. ........................................ 345/211; 345/213
(58) Field of Search .................................. 345/211, 213

(56) References Cited

U.S. PATENT DOCUMENTS

| | | | | |
|---|---|---|---|---|
| 6,043,803 A | * | 3/2000 | Shimizu | 345/132 |
| 6,160,542 A | * | 12/2000 | Hwang | 345/213 |
| 6,201,535 B1 | * | 3/2001 | Hwang | 345/213 |
| 6,333,751 B1 | * | 12/2001 | Torii | 345/698 |
| 6,337,682 B1 | * | 1/2002 | Hwang | 345/213 |

* cited by examiner

Primary Examiner—Richard Hjerpe
Assistant Examiner—Jennifer T. Nguyen
(74) Attorney, Agent, or Firm—Robert E. Bushnell, Esq.

(57) ABSTRACT

In an apparatus and a method for automatically controlling the screen status of a liquid crystal display, when externally inputted analogue video signals are converted to digital signals, the frequency and phase of the sampling clock signals are shifted, thereby maintaining the optimum screen status. Each time that a change occurs in the analogue video signals which are inputted from the computer main body into the display panel, the change is detected. When shifting the frequency and/or the phase of the sampling clock signals which are utilized during the conversion of the analogue video signals to digital signals, the optimum frequency and/or the phase are detected, thereby maintaining the picture quality of the screen at the optimum status. A microcomputer outputs control signals to compare first or second comparison data with reference data stored in an internal memory so as to detect the maximum value. Thus, the sampling clock signals of the PLL circuit section are made to have the frequency and/or phase of the maximum value. In accordance with the present invention, this process is carried out automatically as a convenience to the users.

19 Claims, 5 Drawing Sheets

APPARATUS AND METHOD FOR AUTOMATICALLY CONTROLLING SCREEN STATUS OF LIQUID CRYSTAL DISPLAY

CLAIM OF PRIORITY

This application makes reference to, incorporates the same herein, and claims all benefits accruing under 35 U.S.C. §119 from my application APPARATUS AND METHOD FOR AUTOMATICALLY CONTROLLING SCREEN STATUS OF LIQUID CRYSTAL DISPLAY filed with the Korean Industrial Property Office on Jul. 20, 1999 and there duly assigned Serial No. 29386/1999.

BACKGROUND OF THE INVENTION

1. Technical Field

The present invention relates to an apparatus and a method for automatically controlling the screen status of a liquid crystal display. More specifically, the present invention relates to an apparatus and a method for automatically controlling the screen status of a liquid crystal display in which, when the externally inputted analogue video signals are converted to digital signals, the frequency and phase of the sampling clock signals are shifted, thereby maintaining the optimum screen status.

2. Related Art

Generally, a flat panel display (to be called "FPD"), such as liquid crystal display, can be made thin and light unlike the cathode ray tube (CRT) monitors. Further, the images can be displayed in a clear form without distortion. Therefore, the application of the FPD is being expanded widely, even to notebook computers.

In the FPD, analogue signals have to be converted to digital signals, so that the analogue interface environment for the CRT monitor can be supported. Accordingly, in order to convert the analogue signals to digital signals, clock signals are generated.

In this situation, if the signal source is not exactly matched with the phase of the clock signal, then the picture quality is deteriorated. Therefore, each time that a change occurs in the signals source, the phase of the sampling clock signals has to be adjusted.

In such a system, one solution is to require the user to manipulate a screen control key while observing the display panel in the expectation of shifting the phase of the sampling clock signals, thereby adjusting picture quality.

However, this can cause inconvenience to the user. Moreover, many users do not have the experience or the knowledge to be able to manipulate screen control properly so that adjustment of picture quality is not achieved.

Therefore, there is a need for the development of an apparatus and method for automatically adjusting or controlling the screen status of a liquid crystal display so as to properly shift the phase of the sampling clock signals and achieve proper adjustment of picture quality.

SUMMARY OF THE INVENTION

The present invention is intended to overcome the above described disadvantages of the conventional technique.

Therefore, it is an object of the present invention to provide an apparatus and a method for automatically controlling the screen status of a liquid crystal display in which, when the externally inputted analogue video signals are converted to digital signals, the frequency and phase of the sampling clock signals are shifted, thereby maintaining the optimum screen status.

In a first aspect of the present invention, in achieving the above object, the apparatus for automatically controlling the screen status of a liquid crystal display according to the present invention includes: a PLL circuit section for converting the frequency of sampling clock signals in response to externally inputted control signals; an A/D converter for converting analogue video signals of a computer main body to digital signals in response to the sampling clock signals of the PLL circuit section; a graphic control section for scaling the digital signals of the A/D converter in response to externally inputted control signals so as to display picture signals on a display panel; a data generating section for receiving the video signals from the A/D converter and calculating differences between adjacent video signals so as to sum up the differences thus calculated, and to form first comparison data; and a microcomputer for converting the frequency of the sampling clock signals by using reference data, so as to output control signals and to convert the frequency of the clock signals of the PLL circuit section, for comparing the first comparison data of the data generating section with reference data so as to detect a maximum value, for controlling the sampling clock signals to have a present frequency, and for recognizing a resolution of a video mode of the computer main body so as to control the overall system.

In a second aspect of the present invention, the apparatus for automatically controlling the screen status of a liquid crystal display according to the present invention includes: a PLL circuit section for converting the frequency of sampling clock signals in response to externally inputted control signals; an A/D converter for converting analogue video signals of a computer main body to digital signals in response to the sampling clock signals of the PLL circuit section; a graphic control section for scaling the digital signals of the A/D converter in response to externally inputted control signals so as to display picture signals on a display panel; a data generating section for detecting first and last points of horizontal lines of the video signals of the A/D converter to sum up the points thus detected so as to form second comparison data; and a microcomputer for converting the frequency of the sampling clock signals by using reference data, for outputting control signals to convert the frequency of the clock signals of the PLL circuit section, for comparing the second comparison data of the data generating section with reference data to detect a maximum value, for controlling the sampling clock signals to have a present frequency, and for recognizing the resolution of a video mode of the computer main body so as to control the overall system.

In a third aspect of the present invention, the apparatus for automatically controlling the screen status of a liquid crystal display according to the present invention includes: a PLL circuit section for converting the frequency of sampling clock signals in response to externally inputted control signals; an A/D converter for converting analogue video signals of a computer main body to digital signals in response to the sampling clock signals of the PLL circuit section; a graphic control section for scaling the digital signals of the A/D converter in response to externally inputted control signals so as to display picture signals on a display panel; a data generating section for receiving the video signals from the A/D converter so as to calculate differences between adjacent video signals and to sum up the differences thus calculated so as to form first comparison data, and for detecting first and last points of horizontal lines of the video signals of the A/D converter to sum up the points thus detected so as to form second comparison data;

and a microcomputer for converting the frequency of the sampling clock signals by using reference data, for comparing the first and second comparison data of the data generating section with respective reference data to detect respective maximum values, for controlling the sampling clock signals to have a present frequency, and for recognizing the resolution of a video mode of the computer main body so as to control the overall system.

In a fourth aspect of the present invention, the method for automatically controlling the screen status of a liquid crystal display according to the present invention includes the steps of: (1) initializing a memory, the memory having a predetermined number of times of outputting; (2) receiving comparison data from an outside source; (3) determining whether the comparison data is larger than predetermined reference data; (4) replacing the reference data with the comparison data and storing it if the comparison data is larger than the reference data, and storing the reference data as it is if the comparison data is smaller than the reference data; (5) counting the number of receptions of the comparison data; (6) determining whether the number of the counted times is same as a set number of times; and (7) controlling the sampling clock signals by using the reference data if the counted number of times is the same as the set number of times, and returning to step (2) and repeating from step (2) on if the counted number of times is less than the set number of times.

BRIEF DESCRIPTION OF THE DRAWINGS

A more complete appreciation of the invention, and may of the attendant advantages, thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

The preferred embodiments will be described in detail referring to the attached drawings.

Figure 1:
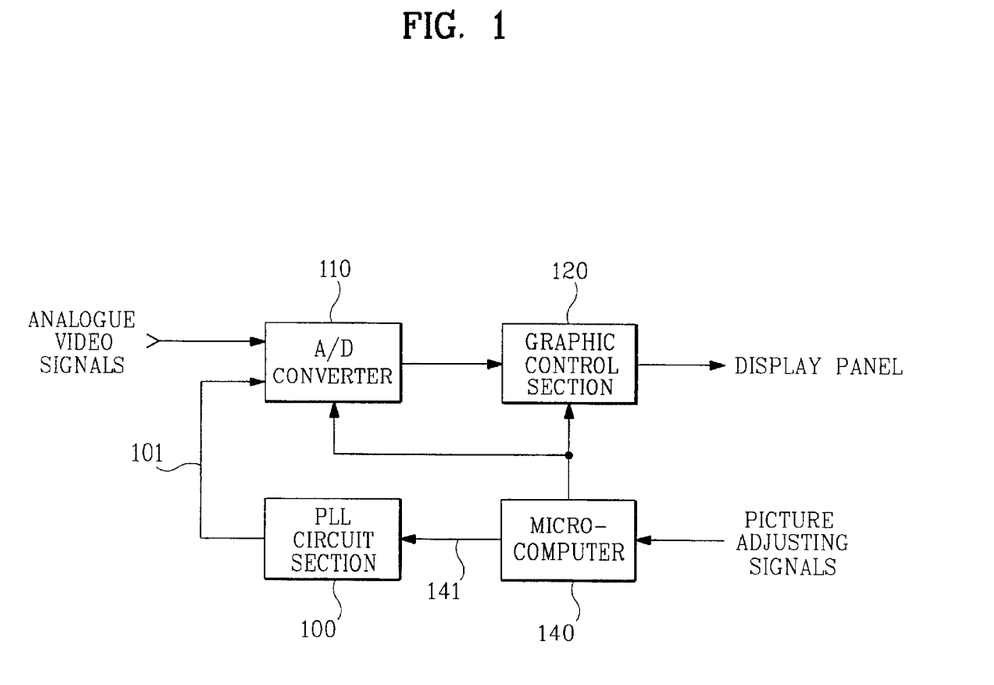
FIG. 1 is a block diagram of an apparatus for controlling the screen status of a liquid crystal display.

FIG. 1 is a block diagram showing the constitution of the apparatus for controlling the screen status of a liquid crystal display.

As shown in this drawing, a PLL circuit section 100 converts the phase of sampling clock signals 101 in response to control signals from a microcomputer 140.

An A/D converter 110 converts analogue video signals from a computer main body to digital signals with the help of the sampling clock signals 101 of the PLL circuit section 100.

A graphic control section 120 carries out scaling on the converted digital signals of the A/D converter 110 in response to control signals from the microcomputer 140, thereby displaying image signals on a display panel.

The microcomputer 140 outputs control signals so that the phase of the sampling clock signals 101 can be converted in response to screen control signals (which are inputted by manipulating the user keys). Further, the microcomputer 140 recognizes the video mode resolution which is inputted from the computer main body, thereby controlling the overall system.

In addition, the microcomputer 140 recognizes the resolution of the present video mode with the help of horizontal synchronizing signals which are inputted from the computer main body (not illustrated). Then, the microcomputer 140 outputs control signals to the A/D converter 110 and to the graphic control section 120 so as to control the entire system based on the recognized video mode resolution. The A/D converter 110 converts the analogue video signals from the computer main body to digital signals in response to the sampling clock signals 101 which are inputted from the PLL circuit section 100. The digital signals thus provided by A/D converter 110 are inputted to the graphic control section 120, and the graphic control section 120 carries out scaling in accordance with the present video mode resolution and in response to the control signals of the microcomputer 140.

Under this condition, if a change occurs in the source of the analogue video signals inputted to the A/D converter 110, then the phase of the analogue video signals does not exactly match the phase of the sampling clock signals which are inputted to the A/D converter 110 by the PLL circuit section 100. In such a case, the user manipulates the screen control key in a stepwise manner while watching the display panel. In that manner, the phase of the sampling clock signals 101 is shifted, thereby adjusting the picture quality.

However, in the above described display method, the user has to manually manipulate the picture adjusting key while watching the picture status. Therefore, an inconvenience to the user results, and accurate control becomes impossible or difficult. Furthermore, since the general user does not understand how to adjust the phase of the sampling clock signals, control of the picture quality is not generally realized.

Figure 2:
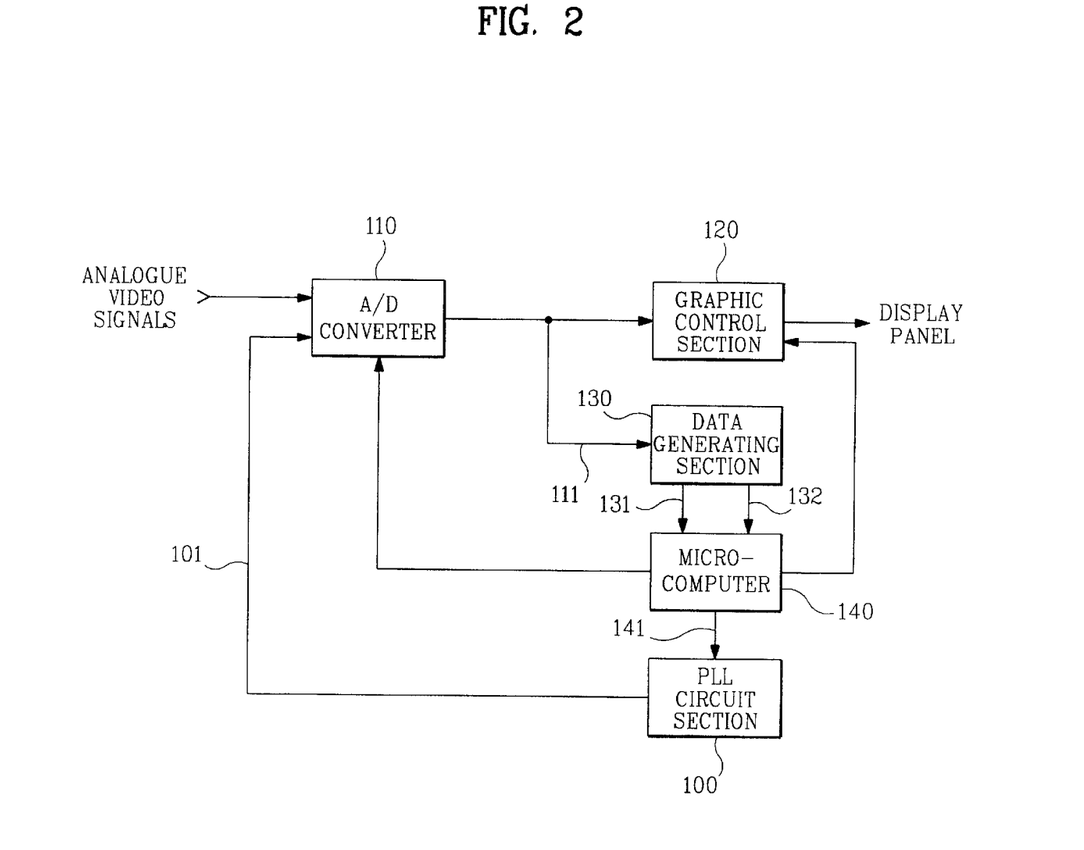
FIG. 2 is a block diagram of an apparatus for controlling the screen status of the liquid crystal display according to the present invention.

FIG. 2 is a block diagram of an apparatus for controlling the screen status of a liquid crystal display according to the present invention.

The apparatus of FIG. 2 includes A/D converter 110 and a graphic control section 120 which are the same as those previously described. The apparatus also includes data generating section 130, a microcomputer 140 and a PLL circuit section 100 which have new functions, and which will be described.

The PLL circuit section 100 converts the phase or frequency of sampling clock signals 101 in response to control signals from the microcomputer 140 so as to output the converted signals to the A/D converter 110.

The phase shift of the sampling clock signals 101 is a shift of 360°, in which case the number of the shifting steps is decided by the device characteristics of the PLL circuit section 100. If the PLL circuit section 100 converts the phase of the sampling clock signals 101 in 32 steps, then the phase position becomes about 11.25°.

Meanwhile, as in the phase shift of the sampling clock signals 101, the frequency shift of the sampling clock signals 101 differs depending on the device characteristics of the PLL circuit section 100. The PLL circuit section 100 uses H.Sync as a reference, and under this condition, if the device value of the PLL circuit section 100 has been fixed to 100, and if an H.Sync of 10 KHz is inputted, then the sampling clock signals 101 have a frequency of 1 MHZ.

The data generating section 130 receives the converted digital video signals from the A/D converter 110 and calculates the difference between two adjacent video signals of a horizontal line. Then the differences thus calculated are summed up to form first data 131.

Meanwhile, the data generating section 130 receives the converted digital signals 111 from the A/D converter 110, detects the first and last points of horizontal lines, and sums up the values of the first and last points so as to form second data 132.

The microcomputer 140 compares the first data 131 or second data 132 from the data generating section 130 with reference data stored in an internal memory. Further, the microcomputer 140 outputs control signals to the PLL circuit section 100 for converting the phase or frequency of the sampling clock signals 101.

Figure 3:
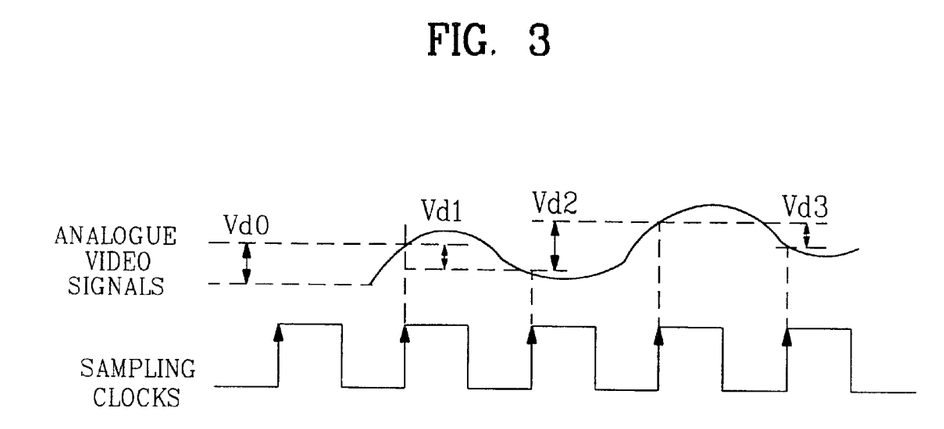
FIGS. 3 and 4 illustrate the wave patterns for a first embodiment of the present invention.
Figure 4:
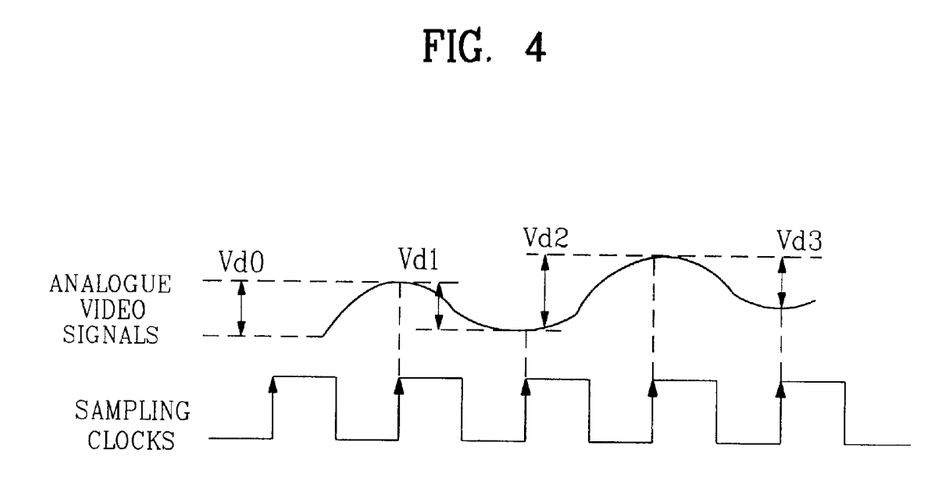

FIGS. 3 and 4 illustrate the wave patterns for a first embodiment of the present invention. FIG. 3 illustrates the case where the frequency of the sampling clock signals is not optimum. FIG. 4 illustrates the case where the frequency of the sampling clock signals is optimum. If the differences Vd0–Vd3 between the respective adjacent video signals are calculated for each of FIGS. 3 and 4, and if the calculated differences Vd0–Vd3 are summed up for each of FIGS. 3 and 4, and if the results for FIGS. 3 and 4 are compared with each other, it is found not only that the summed value for FIG. 4 is larger than that of FIG. 3, but also that the summed value for FIG. 4 is the maximum value.

Therefore, the microcomputer 140 outputs control signals 141 to the PLL circuit section 100 so that the frequency of the sampling clock signals 101 of the PLL circuit section 100 can be converted so as to detect the maximum value.

Figure 5:
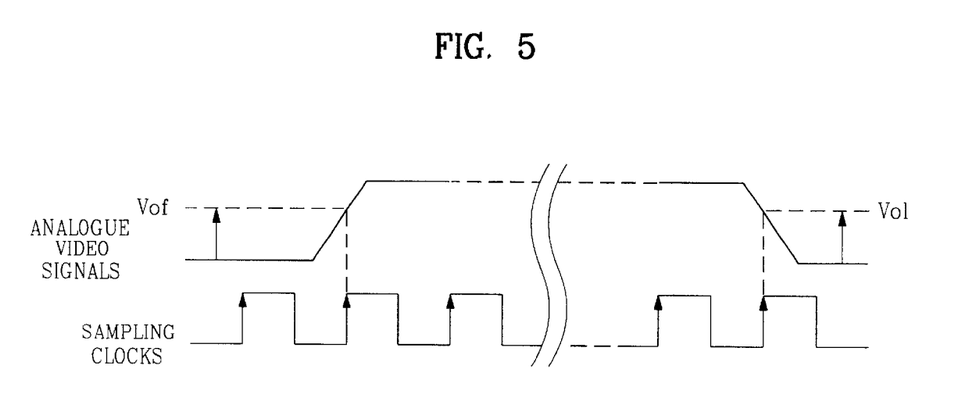
FIGS. 5 and 6 illustrate the wave patterns for a second embodiment of the present invention.
Figure 6:
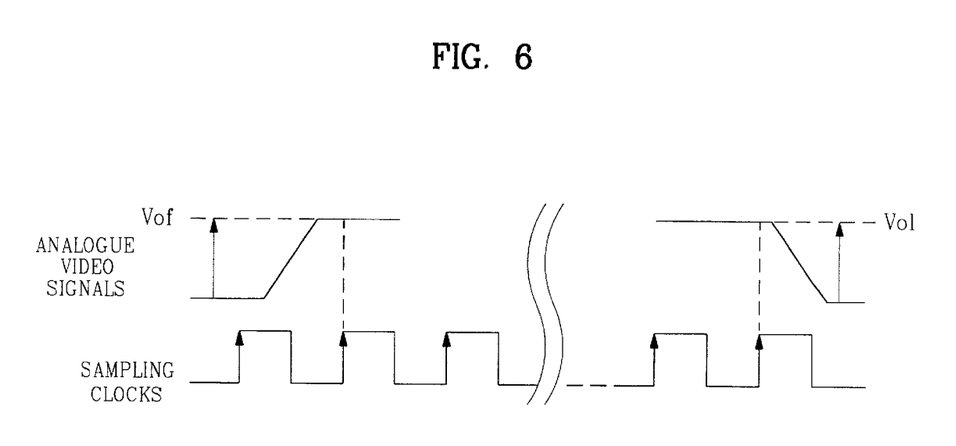

FIGS. 5 and 6 illustrate the wave patterns for a second embodiment of the present invention. That is, the screen status control is realized by converting the phase of the sampling clock signals. FIG. 5 illustrates the case where the phase of the sampling clock signals is not optimum. FIG. 6 illustrates the case where the phase of the sampling clock signals is optimum. The first and last points Vof and Vol, respectively, of the video signals in the horizontal lines of the analogue video signals are detected by utilizing the rising edge of the sampling clock signals 101, and the detected values are summed up for each of FIGS. 5 and 6. Then, the results for FIGS. 5 and 6 are compared with each other, and the summed value is not only larger for FIG. 6 than for FIG. 5, but it is also the maximum value.

Therefore, in order to detect the maximum value, the microcomputer 140 outputs control signals 141 to the PLL circuit section 100 so that the phase of the sampling clock signals 101 of the PLL circuit section 100 can be converted.

Figure 7:
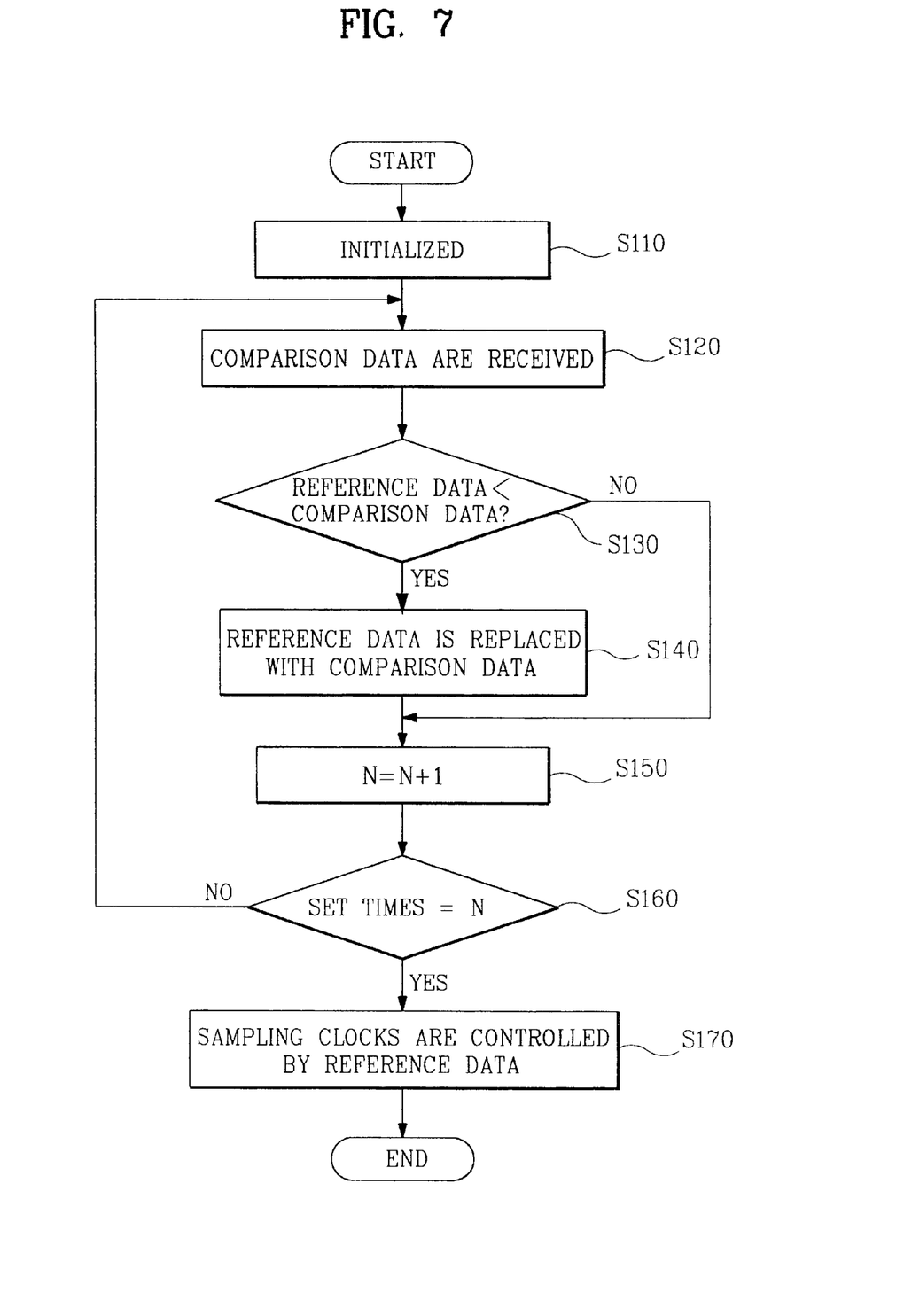
FIG. 7 is a flow chart showing a method for controlling the screen status of the liquid crystal display according to the present invention.

The method for automatically controlling the screen status of the liquid crystal display according to the present invention will now be described with reference to FIG. 7 which is a flow chart showing the method for controlling the screen status of the liquid crystal display according to the present invention.

First, the first embodiment of the present invention will be described referring to FIGS. 2 and 7. The microcomputer 140 initializes an internal memory (not illustrated) which stores the predetermined number of times of outputting the control signals 141 to the PLL circuit section 100 so as to shift the frequency of the sampling clock signals 101 (S110).

The memory stores the number of output times as determined by the circuit characteristics of the PLL circuit section 100.

Then, the microcomputer 140 receives first comparison data 131 from the data generating section 130 (S120). The microcomputer 140 then determines whether the first comparison data is larger than reference data stored in the memory (S130).

If the first comparison data 131 is larger than the reference data, the reference data of the internal memory is replaced with the first comparison data 131 (S140); if data 131 is not larger than the reference data, the replacement step (S140) is skipped. Then, the microcomputer 140 carries out a counting operation by using an internal counter (not illustrated) (S150).

A determination is then made as to whether the predetermined number of times (which is initially set into the internal memory) is the same as the counted number of times (S160).

If it is found at step S160 that the predetermined or set number of times is the same as the counted number of times N, then it is determined that the reference data of the internal memory is the maximum value, and the microcomputer 140 outputs control signals 141 to the PLL circuit section 100 so that the sampling clock signals 101 can be controlled by the reference data and outputted with the present frequency (S170). Under this condition, the first comparison data 131 is the sum of the differences between the adjacent two video signals 111 in the horizontal lines. If, in step 160, it is determined that the set number of times is not equal to the counted number N, then return to step S120 is carried out.

Meanwhile, in a second embodiment of the present invention, the first comparison data 131 is replaced by second comparison data 132 which is the sum of the values of the first and last points of horizontal lines of the video signals 111 which are outputted from the A/D converter 110. Then with the reference data of the internal memory of the microcomputer 140 altered, the phase of the sampling clock signals 101 of the PLL circuit section 100 is shifted based on the procedure of FIG. 7. Thus the optimum phase of the sampling clock signals 101 is found from among the shifting phases. The detailed description will be found as follows. That is, in the first embodiment of the present invention, if the frequency is replaced with the phase, and if the same procedure is carried out, then the optimum phase of the second embodiment can be found. Therefore, any further description on this matter will be skipped s already covered for the first embodiment.

Meanwhile, in a third embodiment of the present invention, the first comparison data 131 of the first embodiment and the second comparison data 132 of the second embodiment are simultaneously employed. Both the frequency and the phase of the sampling clock signals 101 of the PLL circuit section 100 are shifted, and the optimum frequency and the optimum phase of the sampling clock signals 01 are found from among the shifting frequencies and phases. If both the frequency and the phase of both the first and second embodiments are employed, and if the relevant procedure is carried out, then the optimum frequency and phase can be found. Therefore, any further description will be skipped.

According to the present invention as described above, each time that a change occurs in the analogue video signals which are inputted from the computer main body into the display panel, the change is detected. While shifting the frequency and/or the phase of the sampling clock signals which are utilized during the conversion of the analogue video signals to digital signals, the optimum frequency and/or the phase are detected, thereby maintaining the picture quality of the screen at the optimum status. In accordance with the present invention, the latter process is carried out automatically.

In the above, the present invention was described based on the specific preferred embodiments and the attached drawings, but it should be apparent to those ordinarily skilled in the art that various changes and modifications can be added without departing from the spirit and scope of the present invention, which will be defined in the appended claims.

What is claimed is:

1. An apparatus for automatically controlling a screen status of a liquid crystal display associated with a computer main body, said apparatus comprising:

PLL circuit means for converting a frequency of sampling clock signals in response to externally inputted control signals;

A/D converting means for converting analogue video signals of a computer main body to digital video signals in response to the sampling clock signals of said PLL circuit means;

graphic control means for scaling the digital video signals of said A/D converting means in response to further externally inputted control signals so as to display picture signals on a display panel;

data generating means for receiving the digital video signals from said A/D converting means, for calculating differences between adjacent digital video signals, and for summing the differences thus calculated, so as to form comparison data; and microcomputer means for outputting control signals to convert the frequency of the sampling clock signals of said PLL circuit means, for comparing the comparison data of said data generating means with reference data to detect a maximum value, for controlling the sampling clock signals so that they have a present frequency, and for recognizing a resolution of a video mode of said computer main body so as to control an overall system.

2. The apparatus as claimed in claim 1, wherein said microcomputer means compares the comparison data with the reference data to adopt a larger value as a next reference data.

3. The apparatus as claimed in claim 1, wherein a value of a phase shifting of the sampling clock signals is varied depending on device characteristics of said PLL circuit means.

4. The apparatus as claimed in claim 1, wherein said microcomputer means has a sampling clock signal shiftable range of 360°, divides this range by a predetermined number of steps in accordance with device characteristics of said PLL circuit means, and controls said PLL circuit means to shift a phase of the sampling clock signals based on an angle obtained by dividing the range by said predetermined number of steps.

5. An apparatus for automatically controlling a screen status of a liquid crystal display associated with a computer main body, said apparatus comprising:

PLL circuit means for converting a frequency of sampling clock signals in response to externally inputted control signals;

A/D converting means for converting analogue video signals of a computer main body to digital video signals in response to the sampling clock signals of said PLL circuit means;

graphic control means for scaling the digital video signals of said A/D converting means in response to further externally inputted control signals so as to display picture signals on a display panel;

data generating means for detecting first and last points of horizontal lines of the digital video signals of said A/D converting means so as to sum up the points detected and to form comparison data; and microcomputer means for comparing the comparison data of said data generating means with reference data to detect a maximum value, for controlling the sampling clock signals so that they have a present frequency, and for recognizing a resolution of a video mode of said computer main body so as to control an overall system.

6. The apparatus as claimed in claim 5, wherein said microcomputer means compares the comparison data with the reference data to adopt a larger value as a next reference data.

7. The apparatus as claimed in claim 5, wherein a value of a frequency shifting of the sampling clock signals is varied depending on device characteristics of said PLL circuit means.

8. The apparatus as claimed in claim 5, wherein said microcomputer means holds a horizontal synchronizing signal as a reference value, multiplies the reference value by a value determined by the device characteristics of said PLL circuit means to obtain a product, and controls said PLL circuit means with the product so as to cause said PLL circuit means to convert the frequency of the sampling clock signals.

9. An apparatus for automatically controlling a screen status of a liquid crystal display associated with a computer main body, said apparatus comprising:

PLL circuit means for converting a frequency of sampling clock signals in response to externally inputted control signals;

A/D converting means for converting analogue video signals of a computer main body to digital video signals in response to the sampling clock signals of said PLL circuit means;

graphic control means for scaling the digital video signals of said A/D converting means in response to further externally inputted control signals so as to display picture signals on a display panel;

data generating means for receiving the digital video signals from said A/D converting means, for calculating differences between adjacent digital video signals, for summing the differences thus calculated so as to form first comparison data, and for detecting first and last points of horizontal lines of the digital video signals of said A/D converting means so as to sum up the points detected and to form second comparison data; and microcomputer means for comparing the first and second comparison data of said data generating means with respective reference data to detect respective maximum values, for controlling the sampling clock signals so that they have a present frequency, and for recognizing a resolution of a video mode of said computer main body so as to control an overall system.

10. The apparatus as claimed in claim 9, wherein said microcomputer means compares the first and second comparison data with the respective reference data to adopt a larger value as a next reference data.

11. The apparatus as claimed in claim 5, wherein values of a phase shifting and a frequency shifting of the sampling clock signals are varied depending on device characteristics of said PLL circuit means.

12. A method for automatically controlling a screen status of a liquid crystal display, comprising the steps of:

(a) initializing memory, said memory storing a predetermined number of times of outputting;

(b) receiving a comparison data from an outside source;

(c) determining whether the comparison data is larger than reference data;

(d) replacing the reference data with the comparison data and storing it when the comparison data is larger than the reference data and, alternatively, storing the reference data when the comparison data is not larger than the reference data;

(e) counting a number of receptions of the comparison data;

(f) determining whether the number of receptions counted in step (e) is equal to a set number of times; and (g) controlling sampling clock signals by using the reference data when the number of receptions counted in step (e) times is equal to the set number of times, and returning to step (b) when the number of receptions counted in step (e) is not equal to the number of set times.

13. The method as claimed in claim 12, wherein the set number of times used in step (f) varies depending on characteristics of a device which outputs the sampling clock signals.

14. The method as claimed in claim 12, wherein the comparison data received in step (b) is derived by calculating differences between adjacent video signals of incoming video signals, and by summing up the differences.

15. The method as claimed in claim 12, wherein the comparison data received in step (b) is derived by detecting first and last points of horizontal lines of incoming signals, and by summing up the points.

16. An apparatus for automatically controlling a screen status of a liquid crystal display, comprising:

memory means for storing a predetermined number of times of outputting;

receiving means for receiving comparison data from an outside source;

first determining means for determining whether the comparison data is larger than reference data;

replacing means for replacing the reference data with the comparison data and storing it when the comparison data is larger than the reference data and, alternatively, for storing the reference data when the comparison data is not larger than the reference data;

counting means for counting number of receptions of the comparison data;

second determining means for determining whether the number of receptions counted by said counting means is equal to a set number of times; and controlling means for controlling sampling of clock signals by using the reference data when the number of times counted by said counting means is equal to the set number of times.

17. The apparatus as claimed in claim 16, wherein the set number of times used by said second determining means varies depending on characteristics of a device which outputs the sampling clock signals.

18. The apparatus as claimed in claim 16, wherein the comparison data received by said receiving means is derived by calculating differences between adjacent video signals of incoming video signals, and by summing up the differences.

19. The apparatus as claimed in claim 16, wherein the comparison data received by said receiving means is derived by detecting first and last points of horizontal line s of incoming signals, and by summing up the points.

* * * * *